(12) United States Patent
Lee et al.

(10) Patent No.: US 9,999,996 B2
(45) Date of Patent: Jun. 19, 2018

(54) POLYMER OR POLYMER COMPOSITE MEMBRANE HAVING THROUGH-THICKNESS MICROPORES, AND METHOD FOR PREPARING SAME

(71) Applicant: Chung-Ang University Industry-Academy Cooperation Foundation, Seoul (KR)

(72) Inventors: Jonghwi Lee, Seoul (KR); Min Kyung Lee, Suwon-si (KR)

(73) Assignee: CHUNG-ANG UNIVERSITY INDUSTRY-ACADEMY COOPERATION FOUNDATION (KP)

( * ) Notice: Subject to any disclaimer, the term of this patent is extended or adjusted under 35 U.S.C. 154(b) by 424 days.

(21) Appl. No.: 14/243,627

(22) Filed: Apr. 2, 2014

(65) Prior Publication Data

US 2014/0210118 A1    Jul. 31, 2014

Related U.S. Application Data

(63) Continuation of application No. 13/580,849, filed as application No. PCT/KR2010/008508 on Nov. 30, 2010, now abandoned.

(30) Foreign Application Priority Data

May 28, 2010 (KR) .............................. 2010-0050319

(51) Int. Cl.
*B01D 67/00* (2006.01)
*B29C 44/34* (2006.01)
(Continued)

(52) U.S. Cl.
CPC ........ *B29C 44/3415* (2013.01); *B01D 61/147* (2013.01); *B01D 67/00* (2013.01);
(Continued)

(58) Field of Classification Search
None
See application file for complete search history.

(56) References Cited

U.S. PATENT DOCUMENTS

| | | | | |
|---|---|---|---|---|
| 4,026,978 A | * | 5/1977 | Mungle | B01D 67/0011 106/171.1 |
| 4,673,695 A | * | 6/1987 | Aubert | B01D 39/1676 210/500.28 |

(Continued)

FOREIGN PATENT DOCUMENTS

| KR | 10-0183458 | 4/1999 |
|---|---|---|
| KR | 10-2007-0113375 | 11/2007 |

(Continued)

OTHER PUBLICATIONS

Zhang et al., Aligned two- and three-dimensional structures by directional freezing of polymers and nanoparticles, 4 Nature Materials 787, 787-793 (2005).*

(Continued)

*Primary Examiner* — Krishnan S Menon
*Assistant Examiner* — Brad Gordon
(74) *Attorney, Agent, or Firm* — Swanson & Bratschun, L.L.C.

(57) ABSTRACT

A polymer or polymer composite membrane having through-thickness micropores and a method of preparing the same are provided. More particularly, a polymer or polymer composite membrane having a pore structure such that micropores are aligned in a mesh structure in the thickness direction of the polymer or polymer composite membrane due to unidirectional freezing in the thickness direction of a solvent. The membrane has through-thickness micropores, and thus has improved permeability in the thickness direction and superior uniformity in size of the micropores and wall thickness between the micropores. For these reasons, (Continued)

the membrane can be used for a porous membrane substrate, microfiltration membrane, etc.

9 Claims, 5 Drawing Sheets

(51) Int. Cl.
    *B01D 61/14* (2006.01)
    *B01D 69/02* (2006.01)
    *B01D 71/32* (2006.01)
(52) U.S. Cl.
    CPC ......... *B01D 67/0002* (2013.01); *B01D 69/02* (2013.01); *B01D 71/32* (2013.01); *B01D 2323/08* (2013.01); *B01D 2325/02* (2013.01)

(56) References Cited

U.S. PATENT DOCUMENTS

| | | | | |
|---|---|---|---|---|
| 5,677,355 | A * | 10/1997 | Shalaby | A61K 9/122 424/486 |
| 5,795,920 | A * | 8/1998 | Kang | B01D 67/0011 210/500.39 |
| 2004/0084169 | A1 * | 5/2004 | Roche | B22C 9/126 164/45 |
| 2004/0214157 | A1 * | 10/2004 | Burton | B01D 15/388 435/5 |

FOREIGN PATENT DOCUMENTS

| | | | |
|---|---|---|---|
| KR | 10-2008-0076253 | 8/2008 | |
| KR | 100886845 B1 * | 3/2009 | ......... B29C 44/3461 |
| KR | 10-2009-0111362 | 10/2009 | |

OTHER PUBLICATIONS

Hensley et al., The effects of thermal annealing on commercial Nafion membranes, 298 J. Membr. Sci. 190, 190-201 (2007).*

Zhang et al., Aligned two- and three-dimensional structures by directional freezing of polymers and nanoparticles, 4 Nature Materials 787, 787-793 (2005). (Year: 2005).*

Hensley et al., The effects of thermal annealing on commercial Nafion membranes, 298 J. Membr. Sci. 190, 190-201 (2007). (Year: 2007).*

International Search Report dated Aug. 30, 2011 for International Patent Application No. PCT/KR2010/008508.

Kim et al. (2013) *Macromolecular Research* (21:2) "Large-Area PVDF Membranes with Through-Thickness Porosity Prepared by Uni-Directional Freezing" p. 194-201.

Kim and Lee (2013) *Journal of Crystal Growth* (373) "Directional crystallization of dioxane in the presence of PVDF producing porous membranes" p. 45-49.

Lee et al. (2010) *Polymer 51* "Membranes with through-thickness porosity prepared by unidirectional freezing" p. 6258-6267.

* cited by examiner

[FIG. 1]
(1) Freezing  (2) After drying
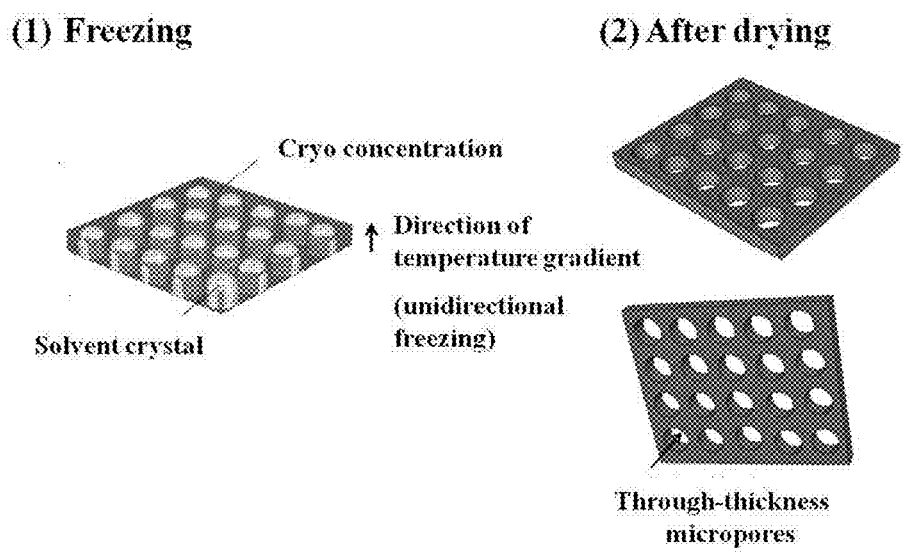
[FIG. 2]
Velocity
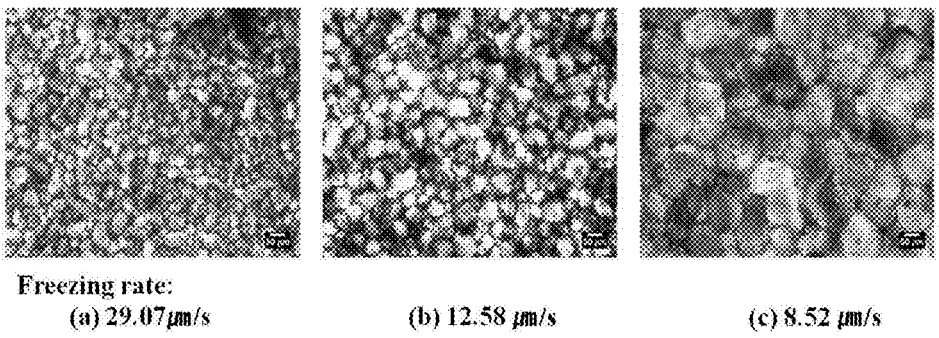
Freezing rate:
(a) 29.07 μm/s   (b) 12.58 μm/s   (c) 8.52 μm/s

[FIG. 3]
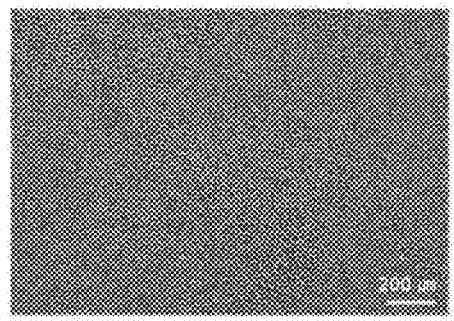
(a) PTFE
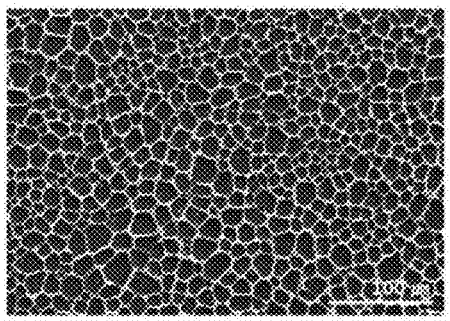
(b) PTFE/SiO$_2$
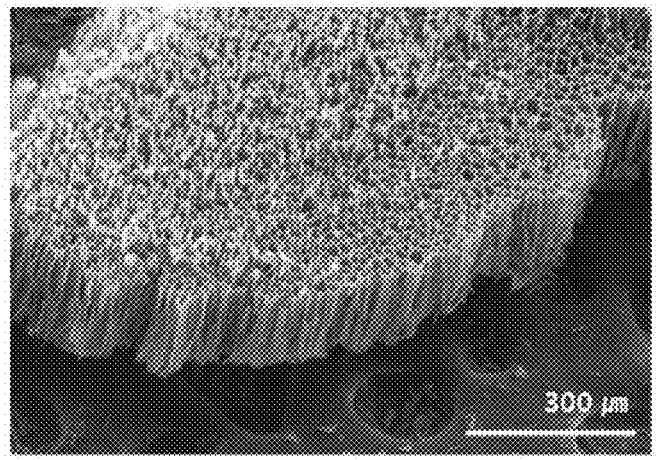
(c) Micropores aligned in thickness direction

[FIG. 4]
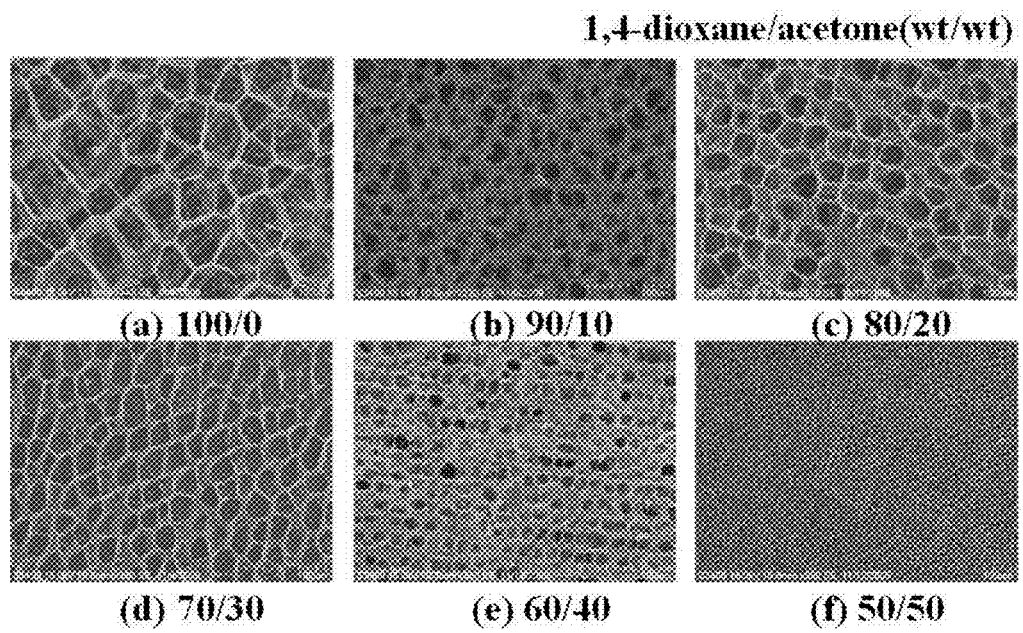
[FIG. 5]
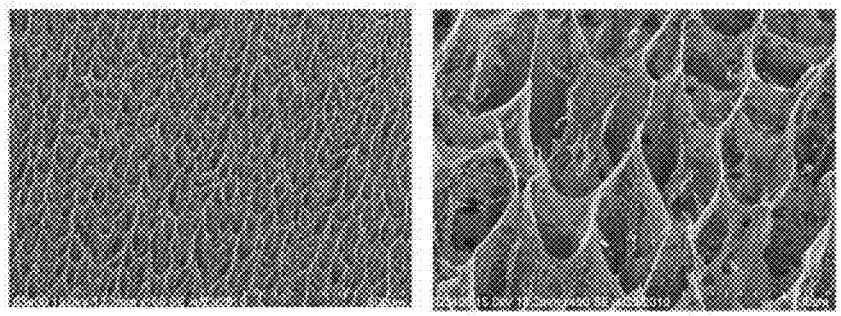
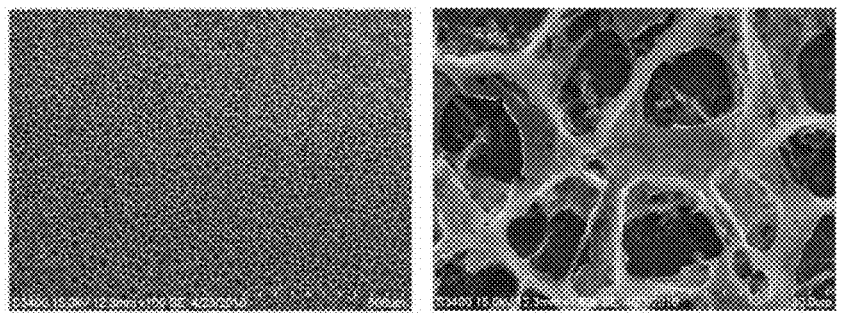

[FIG. 6]
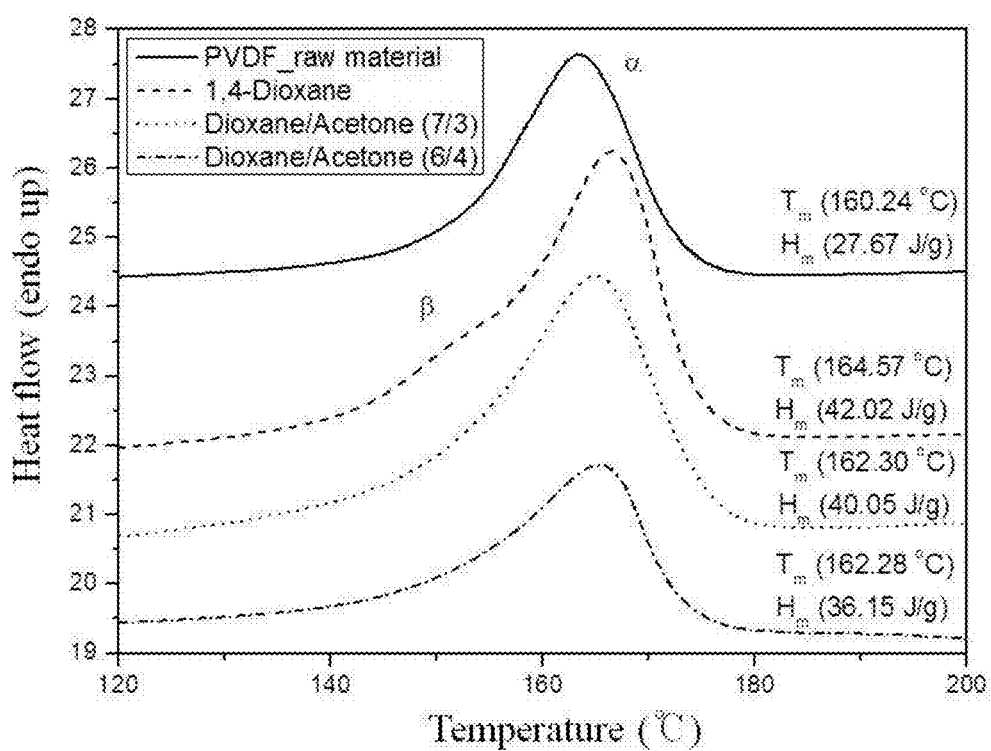

[FIG. 7]
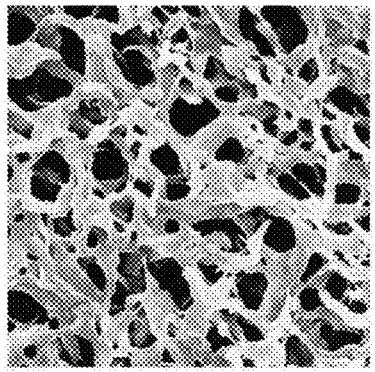
PVDF, 3D mesh structure
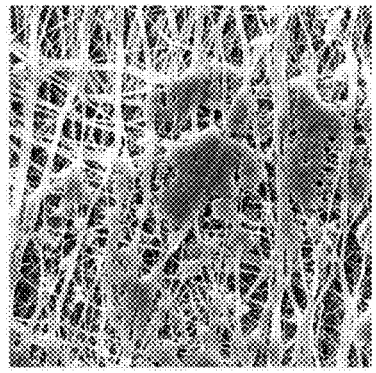
PTFE, fibrous mesh structure
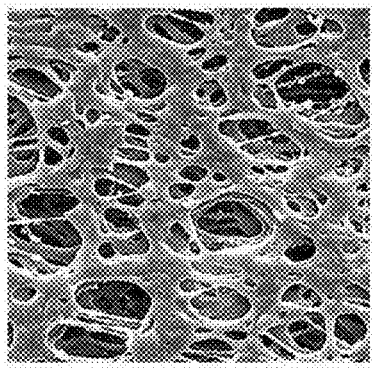
Polyethersulfone
(Irregularly grown independent pore structure)
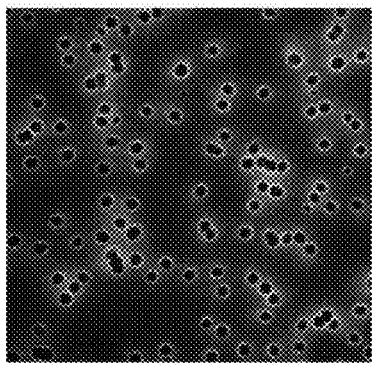
Polycarbonate
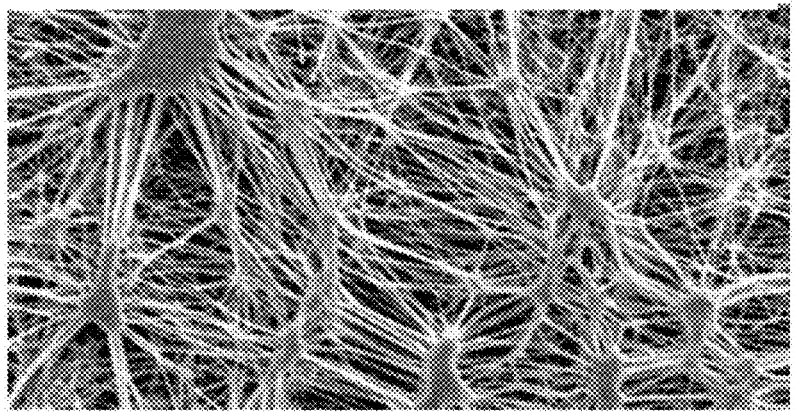
Gore Tex:PTFE, fibrous mesh structure

POLYMER OR POLYMER COMPOSITE MEMBRANE HAVING THROUGH-THICKNESS MICROPORES, AND METHOD FOR PREPARING SAME

RELATED APPLICATIONS

This application is a continuation of U.S. application Ser. No. 13/580,849 filed Aug. 23, 2012, entitled "Polymer Or Polymer Composite Membrane Having Through-Thickness Micropores, And Method For Preparing Same," which is a 35 U.S.C. 371 national phase application of PCT/KR10/008508 filed Nov. 30, 2010 (WO 2011/149165), entitled "Polymer Or Polymer Composite Membrane Having Through-Thickness Micropores, And Method For Preparing Same"; PCT/KR10/008508 claims priority to and the benefit of Korean Patent Application No. 2010/0050319 filed May 28, 2010, each of which is incorporated herein by reference in its entirety.

BACKGROUND

1. Field of the Invention

The present invention relates to a polymer or polymer composite membrane having through-thickness micropores and a method of preparing the same, and particularly, to a polymer or polymer composite membrane having through-thickness micropores and a method of preparing the same, in which the polymer or polymer composite membrane has a pore structure in which the micropores are aligned in a mesh structure in a thickness direction by unidirectional freezing in a thickness direction of a solvent, has improved permeability in a thickness direction due to the presence of the through-thickness micropores and excellent uniformity in size of the micropores and wall thickness between the pores, and thus may be used in a porous membrane substrate, microfiltration membrane, etc.

2. Discussion of Related Art

As a functional polymer suitable for effectively driving a membrane, a polymer having excellent thermal stability, chemical stability, oxidation stability and hydrophobicity is generally required. Currently used polymers satisfying these conditions include fluorine-based polymers having a C—F bond and hydrophobic polymers such as polyethylene-, polypropylene-, epoxy-, and polyimide-based polymers. The fluorine-based polymers are physically strong and highly chemically stable due to a high binding strength between fluorine and carbon, and thus have very good durability. As a representative fluorine-based polymer containing sulfone, there is Nafion®, whose chemical name is perfluorosulfonic acid.

Meanwhile, as a polymer having thermal stability, chemical and electrochemical stability and a mechanical strength, polyvinylidene fluoride (PVDF) and polytetrafluoroethylene (PTFE) are widely known. PVDF is relatively simply processed, and its characteristics and performances have been proved since it is already used as a binder in a lithium secondary battery. In addition, PVDF has compatibility with ceramic powder. Examples of applying combinations of PVDF and an inorganic powder to a battery are disclosed in U.S. Pat. Nos. 5,296,318 and 5,643,689, and International Publication Nos. WO 99/44245.

In Korea, technology for mainly preparing a PVDF separation membrane as a porous separation membrane having excellent chemical resistance and durability has been developed and is thus currently used. In the case of PTFE, it has been reported that a planar membrane-type PTFE filter was developed, but a commercial product has not been released. Globally, there are various examples of commercializing the PTFE polymer as a porous separation membrane, but Sumitomo, Japan is the only company to prepare and sell a PTFE membrane in the form of a hollow fiber membrane.

Since a material for the PTFE membrane mentioned above may not be processed by a conventional method for preparing the PTFE filter such as a solvent/non-solvent conversion method or a thermally induced phase separation method using melt spinning, understanding of the material and research on processing factor technology (including extrusion, sintering, stretching, etc.) are at a very poor level, and the technology has not been sufficiently accumulated.

A representative method of preparing a membrane is a method of preparing a transparent porous membrane from a polymer and an inorganic powder using a low boiling point solvent and a high boiling point solvent having a high volatility temperature that is soluble in water by forming micropores by extracting the solvent having a high volatility temperature that is soluble in water.

According to the above-mentioned method, since the preparation process is complicated, and prepared pores are not formed through the membrane in a thickness direction, connection of amorphous pores is induced to increase overall porosity. In addition, since the prepared membrane should be dried at room temperature, the preparation of the membrane takes a long time, and the extraction of the high boiling point solvent contained in the membrane also takes a long time, which means that the method is difficult to apply on a commercial scale. When the membrane is used for an energy device, a remaining solvent may have a negative effect on battery performance, and when porosity characteristics such as a forming direction of the pores and a pore size are not suitably controlled, the method is also difficult to apply in terms of permeability.

Accordingly, there is a demand for a simple and economical method of easily controlling a size, structure and porosity of a pore, thereby mitigating these problems and determining characteristics of a membrane. Particularly, to effectively improve and control permeability, it is necessary to form micropores through a membrane having low tortuosity in a thickness direction. In addition, a method of forming the micropores should not be an inefficient method, for example, of punching the membrane using a template or laser beam to form each micropore in the thickness direction.

SUMMARY OF THE INVENTION

The present invention is directed to providing a polymer or polymer composite membrane having through-thickness micropores which have improved permeability in a thickness direction by unidirectional freezing of the polymer and a uniform size of the micropores and wall thickness between pores, a method of preparing the same, and the use of the membrane.

The present invention is also directed to providing a method capable of controlling a size of membrane pores by unidirectional freezing of a polymer.

One aspect of the present invention provides a method of preparing a polymer or polymer composite membrane having through-thickness micropores, including unidirectionally freezing a polymer solution, and freeze-drying the resulting frozen material by the freezing.

Another aspect of the present invention provides a polymer or polymer composite membrane having micropores aligned in a mesh structure in a width direction, the micropores passing through the membrane unidirectionally in a thickness direction.

Still another aspect of the present invention provides a product including one of a porous membrane substrate, a microfiltration membrane, a waterproof and breathable membrane, a membrane for controlling diffusion in an energy device, all of which include the polymer or polymer composite membrane according to the present invention.

Yet another aspect of the present invention provides a method of controlling a pore size of a polymer or polymer composite membrane having through-thickness pores including controlling a unidirectional freezing rate of a polymer solution.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 1 is a schematic diagram showing a freezing step of uniaxially forming a solvent crystal according to an exemplary embodiment of the present invention to illustrate a mechanism regarding preparation of a polymer membrane induced by unidirectional freezing in a thickness direction;

FIG. 2 shows optical microscope images showing shapes and distribution of solvent crystals aligned in a thickness direction using unidirectional freezing of a mixed dispersion of PTFE particles and $SiO_2$ nanoparticles according to Example 1 of the present invention;

FIG. 3 shows scanning electron microscope images of a PTFE membrane having through-thickness micropores prepared using unidirectional freezing of the mixed dispersion of PTFE particles and $SiO_2$ nanoparticles according to Example 1 of the present invention;

FIG. 4 shows electron microscope images of a PVDF membrane having through-thickness micropores prepared using unidirectional freezing of a PVDF solution according to Examples 2 and 3 of the present invention;

FIG. 5 shows electron microscope images of a cellulose acetate membrane having through-thickness micropores prepared using unidirectional freezing of a solution of polysulfone (PSF) and cellulose acetate (CA) according to Examples 4 and 5 of the present invention;

FIG. 6 is a thermogram for a PVDF membrane having through-thickness micropores prepared using unidirectional freezing of a PVDF solution, plotted by differential scanning calorimetry (DSC), according to Examples 2 and 3 of the present invention; and FIG. 7 is an electron microscope image of a pore structure of a conventional commercially available membrane available on the market.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Exemplary embodiments of the present invention will be described in detail below with reference to the appended drawings. Elements of the exemplary embodiments are consistently denoted by the same reference numerals throughout the drawings and detailed description, and elements will only be described once.

Hereinafter, constitution of the present invention will be described in detail.

The present invention relates to a method of preparing a polymer or polymer composite membrane having through-thickness pores, which includes unidirectionally freezing a polymer solution; and freeze-drying the resulting frozen materials by the freezing.

The "unidirectional freezing" used herein indicates sequentially performing freezing in a direction perpendicular to a thickness. The unidirectional freezing is a term differentiated from general freezing in which heat is transferred in three different directions, and thus freezing is performed in a triaxial direction. The polymer or polymer composite membrane having unidirectional aligned micropores may be formed by inducing freezing in one direction to align solvent crystals in a single dimension.

The method of preparing a polymer or polymer composite membrane having through-thickness pores does not include directional crystallization and sublimation of a solvent, which are used in a conventional process of preparing a membrane. A film or membrane prepared dependent on micropores generated by a conventional solvent/non-solvent method or biaxial stretching has amorphous pores, and compared with this, the film or membrane has a characteristic of reducing tortuosity of pores subjected to directional crystallization and thus improving permeability of the membrane.

In addition, the method of preparing a polymer or polymer composite membrane having through-thickness pores according to the present invention is characterized in that a size, orientation and porosity of micropores are easily controlled according to a solvent composition ratio and a freezing rate of the following polymer solution.

The method of preparing a polymer or polymer composite membrane having through-thickness pores according to the present invention will be described in detail by steps.

A first step includes dissolving or dispersing polymers in a solvent, and freezing the polymer solution in one direction perpendicular to a thickness.

The polymer may be one having excellent thermal stability, chemical stability, oxidation stability or hydrophobicity, but the present invention is not limited thereto. For example, the polymer may be a fluorine-based polymer having a C—F bond or a hydrophobic polymer.

The fluorine-based polymer may include a polymer or copolymer including at least one of vinylidene fluoride (VDF), tetrafluoroethylene (TFE), ethylenetetrafluoroethylene (ETFE), perfluoroalkoxyalkane (PFA), vinylfluoride (VF), chlorotrifluoroethylene (CTFE), fluorinated ethylene propylene (FEP), hexafluoropropylene (HFP), and perfluoro (propyl vinylether), which may be used alone or in combination of two or more.

The hydrophobic polymer may include polyethylene-, polypropylene-, polysulfone-, polyketone-, polyethersulfone-, cellulose-, cellulose acetate-, cellulose triacetate-, regenerative cellulose, acryl resin-, nylon-, polyamide-, epoxy-, and polyimide-based polymers and copolymers thereof, which may be used alone or in combination of two or more.

In addition, the polymer solution may be prepared by dissolving or dispersing polymers in water, a mixture of water and alcohol or an organic solvent.

The solvent may be a single or mixed solvent in consideration of a kind, solubility and dispersivity of the polymer, a freezing temperature of the solvent, and a vapor pressure.

The organic solvent may include acetone, acetonitrile, acetaldehyde, acetic acid, acetophenone, acetylchloride, acrylonitrile, aniline, benzylalcohol, 1-butanol, n-butylacetate, cyclohexanol, cyclohexanone, 1,2-dibromoethane, diethylketone, N,N-dimethylacetamide, N,N-dimethylformamide, dimethylsulfoxide, 1,4-dioxane, ethanol, ethyl acetate, ethyl formate, formic acid, glycerol, hexamethyl phosphoamide, methyl acetate, methyl ethyl ketone, methyl isobutyl ketone, N-methyl-2-pyrolidone, nitrobenzene, nitromethane, 1-propanol, propylene-1,2-carbonate, tetrahydrofuran, tetramethylurea, triethyl phosphate, trimethyl phosphate, ethylenediamine, and N-methylmorpholine N-oxide (NMMO), which may be used alone or in combination of two or more.

The polymer may be included at 0.01 to 70 parts by weight with respect to 100 parts by weight of the solvent. When the content of the polymer is less than 0.01 parts by weight, polymer particles or molecules are not suitably connected, and thus mechanical properties of the final structure may be limited, and when the content of the polymer is more than 70 parts by weight, a disadvantage of difficult handling of the polymer due to high viscosity is generated, a through-thickness structure may not be finally realized, and thereby pores may be blocked.

In addition, according to a composition ratio of the organic solvent, the size and orientation of the micropores in the membrane of the present invention may be controlled, and these may have an effect on crystallinity of the polymer. For example, according to one embodiment of the present invention, when 1,4-dioxane and acetone, as an organic solvent, are mixed in a ratio of 100 to 50:0 to 50, as the content of the acetone increases, the size of the pores decreases. This may have an effect on the crystallinity of PVDF, and thus a larger crystal in a beta structure may be grown.

In addition, the polymer solution may further include an inorganic material or insoluble organic material.

The inorganic material may include titanium oxide, silica, fumed silica, silicon carbide, silicon nitride, spinel, silicon oxycarbide, glass powder, glass fiber, carbon fiber, graphene, nanotubes, gold microparticles, silver microparticles, alumina, magnesia, silicon nitride, zirconia, zirconium carbide, sialon, nasicon, silceram, mullite, aluminum, copper, nickel, steel, titanium, titanium carbide, and titanium diborate, which may be used alone or in combination of two or more.

The insoluble organic material may be a reinforced particle and a fiber.

The reinforced particle may include vinylon, polyvinylidene chloride, polyvinyl chloride, polyester, acryl, polyacryl, and nylon, which may be used alone or in combination of two or more.

The fiber may be at least one of a spectra fiber and an aramid fiber.

The insoluble organic material may be included at 0.01 to 60 parts by weight with respect to 100 parts by weight of the polymer solution. Within the above content range, stability of polymer dispersion may be ensured.

The freezing of the polymer solution may be performed at a freezing rate of 5 to 500 µm/s using liquid nitrogen from one side in one direction. The freezing time may be controlled by the kind of the solvent, but the present invention is not limited thereto.

A part that is not frozen may be insulated by an insulator such as Styrofoam or aerogel. The unidirectional freezing may sequentially progress in the unfrozen part in a vertical direction of a thickness of the sample, and thus a defect such as a crack is minimized.

In the method of preparing a polymer or polymer composite membrane having through-thickness pores according to the present invention, a second step includes preparing a membrane by freezing-drying the resulting frozen material by the freezing in the first step.

The freezing-drying of the frozen material may be performed for 1 hour to 3 days in a freeze drier, but the present invention is not limited thereto.

The method of preparing a polymer or polymer composite membrane having through-thickness pores according to the present invention may further include reinforcing the membrane prepared in the previous step.

The reinforcing of the membrane may be performed through solvent annealing, thermal annealing, stretching or pressing.

The present invention also relates to a polymer or polymer composite membrane having micropores aligned in a mesh structure in a width direction, the micropores passing through the membrane unidirectional in a thickness direction.

The through-thickness pore of the polymer or polymer composite membrane according to the present invention is induced in the step in which solvent crystals grown in the thickness direction push a solute in the solution in one direction to be aligned. The solvent crystals aligned in one direction during the freezing step are sublimated in the freeze-drying step, and therefore a part in which the solvent crystals are present remains as a pore. In the present invention, the freezing step refers to single dimensional arrangement of solvent crystals due to induction of freezing in one direction. An arrangement structure of a polymer chain may be formed due to the solvent crystals that are aligned and grown, and may change physical properties capable of determining characteristics of the final membrane. As the unidirectional freezing is induced, the solvent crystals are aligned in a single dimension, and thus a membrane having minimized tortuosity can be prepared.

A diameter of the pores is 0.1 to 1000 μm, and a distance between the pores may be 0.001 to 50 μm.

The membrane of the present invention is greatly improved in permeability in a thickness direction, unlike a conventional porous membrane having a lamella pattern, and also improved in uniformity in size of a micropore and wall thickness between the pores.

In addition, the pores are characterized by enabling minimization of fouling because of their asymmetric structure in which one end has a larger size than the other end.

The pores "having an asymmetric shape" used herein refers to the micropores being aligned in a mesh structure in a width direction, in which adjacent pores have different sizes, that is, one is larger than the adjacent one in size.

The present invention also relates to a product including a porous membrane substrate, a microfiltration membrane, a waterproof and breathable membrane, or a membrane for controlling diffusion in an energy device, all of which have the polymer or polymer composite membrane of the present invention.

The polymer membrane having unidirectional (thickness-directional) micropores prepared according to the present invention is greatly improved in permeability in a thickness direction, unlike the conventional lamella porous membrane, and also improved in uniformity in size of micropores and wall thickness between pores. Accordingly, the polymer membrane may be generally applied to application for a porous membrane substrate or a microfiltration membrane, and an effective waterproof and breathable membrane or a polymer composite membrane controlling diffusion in an energy device may be prepared. In addition, in some embodiments, uses of the polymer membrane in various different applications may be found.

The present invention also relates to a method of controlling a pore size of a polymer or polymer composite membrane having through-thickness pores, which includes controlling a unidirectional freezing rate of a polymer solution.

In the method of controlling a pore size of a polymer or polymer composite membrane having through-thickness pores according to the present invention, the unidirectional freezing rate of the polymer solution may be controlled at 5 to 500 μm/s, and thus the pore size may be controlled to 0.1 to 1000 μm.

The freezing rate is preferably 5 to 500 μm/s. When the freezing rate is less than 5 μm/s, a lamella structure of solvent crystals may be formed, and thus through-thickness pores may not be formed, and when the freezing rate is more than 500 μm/s, a diffusion rate of polymer particles or dispersion may not be controlled, and thus regularity of the final structure may be reduced.

Hereinafter, the present invention will be described in further detail with respect to Examples according to the present invention, but the Examples are not intended to limit the scope of the present invention.

<Example 1> Preparation of Membrane Having Through-Thickness Micropores by Unidirectional Freezing of Mixed Solution of PTFE and $SiO_2$ Nanoparticles A membrane having unidirectional pores was prepared according to the following method by arranging ice crystals in a single dimension by inducing unidirectional freezing to freeze a mixed dispersion prepared by dispersing PTFE particles and $SiO_2$ nanoparticles in water using liquid nitrogen from one side in one direction. The PTFE used in Example 1 was one commercially available from Aldrich, and had particles having a size of 200 nm which were dispersed at 60 parts by weight in 100 parts by weight of water. $SiO_2$ is a dispersion type commercially available from ENB, has a size of 30 nm, and is dispersed at 30 parts by weight in 100 parts by weight of water.

(a) PTFE dispersed at 60 parts by weight in water was diluted with water to a ½ concentration, and thereby a PTFE dispersion was prepared at 30 parts by weight.

(b) A $SiO_2$ dispersion in which $SiO_2$ dispersed at 30 parts by weight in water was used without additional treatment.

The dispersions in steps (a) and (b) were mixed together and stirred for several minutes, and then thinly were spread on a substrate by containing the mixed solution in a small sprayer and spraying the mixed solution onto a substrate (40 cm×20 cm glass substrate or PDMS).

A membrane was prepared by freezing the mixed dispersion spread on the side glass using liquid nitrogen from one side in one direction (using a micro-moving motor), and drying materials perfectly frozen by the freezing step in a freeze drier for 24 hours (FD-1000 freeze drier, EYELA, Tokyo, Japan, trap chilling temperature: −45° C., 5.6 Pa).

The membrane was reinforced by thermal annealing after the preparation of the membrane.

As shown in FIGS. 2 and 3, miropores aligned in a thickness direction were confirmed, and it was also confirmed that the structure of the micropores was able to be controlled according to a freezing rate and a composition ratio of the polymer solution.

<Example 2> Preparation of Membrane Having Through-Thickness Micropores by Unidirectional Freezing of PVDF-Mixed Solution A membrane having unidirectional pores was prepared according to the following method by aligning solvent crystals in a single dimension by inducing unidirectional freezing to freeze a PVDF solution (Aldrich, weight average molecular weight: 534,000 g/mol) using liquid nitrogen from one side in one direction.

(a) 0.5 g of PVDF (Aldrich, weight average molecular weight: 534,000) was placed in a 10 ml glass.

(b) 5 g of 1,4-dioxane was added to the glass of step (a), thereby preparing a PVDF solution, and for uniform dissolution, the solution was left in a 50 to 60° C. oven for 6 hours, and then 0 to 5 g of titanium oxide particles was added and dispersed.

A membrane was prepared by pouring a suitable amount of the uniformly dissolved solution on a substrate (20 cm×10 cm glass substrate or PDMS), freezing the mixed dispersion of steps (a) and (b) spread on the slide glass using liquid nitrogen from one side in one direction, and drying materials perfectly frozen by the freezing step in a freeze drier for 24 hours (FD-1000 freeze drier, EYELA, Tokyo, Japan, trap chilling temperature: −45° C., 5.6 Pa).

<Example 3> Preparation of Membrane Having Through-Thickness Micropores by Unidirectional Freezing of PVDF Dissolved in Cosolvent A membrane having unidirectional pores was prepared according to the following method by arranging solvent crystals in a single dimension by inducing unidirectional freezing to freeze PVDF dissolved in a cosolvent using liquid nitrogen from one side in one direction.

The membrane was prepared by the same method as in Example 2 except that a cosolvent (acetone) was added instead of a single use of 1,4-dioxane in (b) of Example 2.

After the preparation of the membrane, a post-treatment process was performed using a cosolvent.

As shown in FIG. 4, it was seen that a size and orientation of micropores could be controlled according to a composition of the cosolvent, and since the cosolvent had an effect on crystallinity of the PVDF, crystals of a beta structure could be further grown.

<Example 4> Preparation of Membrane Having Through-Thickness Micropores by Unidirectional Freezing of Polysulfone-Mixed Solution A membrane having unidirectional pores was prepared according to the following method by arranging solvent crystals in a single dimension by inducing unidirectional freezing to freeze polysulfone (Aldrich, weight average molecular weight: 22,000 g/mol) using liquid nitrogen from one side in one direction.

(a) 0.5 g of polysulfone (Aldrich, weight average molecular weight: 22,000 g/mol) was placed in a 10 ml glass.

(b) 5 g of N,N-dimethylacetamide was added to the glass of (a), thereby preparing a polysulfone solution, and for uniform dissolution, the solution was left in a 50 to 60° C. oven for 6 hours, and then 0 to 5 g of titanium oxide particles was added and dispersed.

A membrane was prepared by pouring a suitable amount of the uniformly dissolved solution on a substrate (8 cm×8 cm glass substrate or PDMS), freezing the mixed dispersion of steps (a) and (b) spread on the slide glass using liquid nitrogen from one side in one direction, and drying materials perfectly frozen by the freezing step in a freeze drier for 24 hours (FD-1000 freeze drier, EYELA, Tokyo, Japan, trap chilling temperature: −45° C., 5.6 Pa).

<Example 5> Preparation of Membrane Having Through-Thickness Micropores by Unidirectional Freezing of Cellulose Acetate (CA)-Mixed Solution A membrane having unidirectional pores was prepared according to the following method by arranging solvent crystals in a single dimension by inducing unidirectional freezing to freeze a CA (Aldrich, weight average molecular weight: 30,000 g/mol, 39.8 wt % acetyl) solution using liquid nitrogen from one side in one direction.

(a) 0.5 g of CA (Aldrich, weight average molecular weight: 30,000 g/mol) was placed in a 10 ml glass.

(b) 5 g of N,N-dimethylacetamide was added to the glass of (a), thereby preparing a CA solution, and for uniform dissolution, the solution was left in a 50 to 60° C. oven for 6 hours, and then 0 to 5 g of silica particles was added and dispersed.

A membrane was prepared by pouring a suitable amount of the uniformly dissolved solution on a substrate (40 cm×20 cm glass substrate or PDMS), freezing the mixed dispersion of steps (a) and (b) spread on the slide glass using liquid nitrogen from one side in one direction, and drying materials perfectly frozen by the freezing step in a freeze drier for 24 hours (FD-1000 freeze drier, EYELA, Tokyo, Japan, trap chilling temperature: −45° C., 5.6 Pa).

As shown in FIG. 5, it was confirmed that micropores were aligned in a thickness direction.

<Experimental Example 1> Examination of Pores of Membrane According to Whether Post-Treatment Process was or was not Performed A pore ratio of the PVDF membrane prepared using unidirectional freezing of the PVDF solution according to Example 2 was measured (mercury intrusion porosimetry).

TABLE 1

|  | Membrane before annealing treatment (not annealed) | Membrane after annealing treatment (annealed at 100° C. for 2 hours) |
|---|---|---|
| Pore Diameter | 3.4 μm | 3.0 μm |
| Porosity | 80.4% | 79.3% |

As shown in Table 1, it was seen that there was a small difference in porosity before and after annealing treatment.

<Experimental Example 2> Comparison of Filtration Test for Commercially Available Membrane and Membrane of the Present Invention A filtration test was performed to compare the PVDF membrane having through-thickness micropores prepared by unidirectional freezing of the PVDF solution according to Example 2 with the conventional PTFE membrane commercially available on the market.

TABLE 2

| Kind of Membrane | Filtration Time (s) | Average Membrane Filtration rate (Flux, mL/s) |
|---|---|---|
| Comparative Example 1 (PTFE Membrane Product) | 101.3 | 0.0098 |
| PVDF Membrane (Inventive) | 65.3 | 0.015 |

The high-strength membrane having minimized tortuosity according to the present invention can be applied to an application for a porous membrane substrate or microfiltration membrane (MF membrane), and also used in a waterproof and breathable membrane, or a polymer composite membrane for controlling diffusion in an energy device.

In general freezing, since heat is transferred in three directions, solvent crystals are formed in a triaxial direction while the directions of the solvent crystals are crossed. However, freezing in the present invention is induced in one direction to align solvent crystals in a single dimension. As a result, a membrane having finally unidirectional micropores and also having minimized tortuosity can be prepared. In addition, according to the present invention, a sublimating rate of the solvent crystals aligned in a single dimension increases, and thus an amount of a remaining solvent can be effectively minimized. The unidirectional freezing step according to the present invention is sequentially performed in a direction perpendicular to a thickness, and thus a defect that can be generated in freezing and drying steps can be minimized. For this reason, a high-strength membrane can be prepared.

A polymer composite membrane according to the present invention can be applied in an application for a porous membrane substrate or an MF membrane, and also used to effectively prepare a waterproof and breathable membrane or a polymer composite membrane for controlling diffusion in an energy device. Since these membranes can have a multi-layered structure, and the membrane of the present invention also has a single layer in a multi-layered structure, the membrane of the present invention can be used in various different applications.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of preparing a polymer or polymer composite membrane having micropores aligned in a width direction, and passing through the membrane unidirectionally in a thickness direction, comprising:
    unidirectionally freezing a polymer solution sequentially from one side of the membrane in one direction perpendicular to the thickness direction;
    wherein the polymer solution is prepared by dissolving or dispersing a hydrophobic polymer in a mixture of 1,4-dioxane and acetone, wherein the mixture has a weight ratio of 1,4-dioxane to acetone of 80:20 to 60:40 to control a size and orientation of the micropores and a crystallinity of the polymer or polymer composite; and
    freeze-drying the resulting materials frozen by the freezing.

2. The method of claim 1, wherein the hydrophobic polymer includes at least one selected from the group consisting of polyethylene-, polypropylene-, polysulfone-, polyketone-, polyethersulfone-, cellulose-, cellulose acetate-, cellulose triacetate-, regenerative cellulose-, acryl resin-, nylon-, polyamide-, epoxy-, and polyimide-based polymers and copolymers thereof.

3. The method of claim 1, wherein the hydrophobic polymer is included at 0.01 to 70 parts by weight with respect to 100 parts by weight of the solvent.

4. The method of claim 1, wherein the polymer solution further includes an inorganic material.

5. The method of claim 4, wherein the inorganic material includes at least one selected from the group consisting of titanium oxide, silica, fumed silica, silicon carbide, silicon nitride, spinel, silicon oxycarbide, glass powder, glass fiber, carbon fiber, graphene, nanotubes, gold microparticles, silver microparticles, alumina, magnesia, zirconia, zirconium carbide, sialon, nasicon, silceram, mullite, aluminum, copper, nickel, steel, titanium, titanium carbide, and titanium diborate.

6. The method of claim 1, wherein the polymer solution is frozen at a freezing rate of 5 to 500 µm/s using liquid nitrogen from one side in one direction.

7. The method of claim 6, wherein an unfrozen part is insulated by an insulator.

8. The method of claim 1, wherein the resulting frozen materials by the freezing are dried in a freeze drier for 1 hour to 3 days.

9. The method of claim 1, further comprising reinforcing the membrane by at least one selected from the group consisting of solvent annealing, thermal annealing, stretching and pressing.

* * * * *